Jan. 24, 1967    R. A. MILLER ETAL    3,300,701

ELECTRIC MOTOR CONTROL APPARATUS

Filed Nov. 29, 1963    3 Sheets-Sheet 1

INVENTORS R. A. MILLER
C. M. TARIS
BY [signature]
ATTORNEY

Jan. 24, 1967 R. A. MILLER ET AL 3,300,701

ELECTRIC MOTOR CONTROL APPARATUS

Filed Nov. 29, 1963 3 Sheets-Sheet 3

United States Patent Office 3,300,701
Patented Jan. 24, 1967

3,300,701
ELECTRIC MOTOR CONTROL APPARATUS
Robert A. Miller, Rumson, and Charles M. Taris, Cranford, N.J., assignors to Bell Telephone Laboratories, Incorporated, New York, N.Y., a corporation of New York
Filed Nov. 29, 1963, Ser. No. 326,918
6 Claims. (Cl. 318—261)

This invention relates to magnetic tape recording machines and more particularly to magnetic tape transports.

The term "tape transport" is commonly applied to the mechanism and associated circuitry employed in a tape recorder to control the physical positioning of the tape—its starting, stopping, guidance and storage. In a tape recorder designed for a conventional use, such as the recording of dictation or the recording of entertainment material, for example, the functional requirements and engineering standards demanded for tape transport mechanisms are relatively modest and accordingly a wide variety of adequate prior art recorders, designed for the purposes indicated, are available.

As the sophistication of the recording environment increases, however, there is a corresponding increase in the variety and in the complexity of the functional requirements that must be met by tape transport mechanisms accompanied by a decrease in the range of permissible design tolerances. An electronic computer is one example of an environment that imposes particularly stringent requirements on the tape transports of the recording machines employed therein. Another example of such an environment is the automatic message accounting (AMA) system employed in electronic central offices (ECO), a relatively new development in the field of telephony. In such AMA systems a record of all toll charge information is recorded in digital code form on magnetic tape rather than on conventional punched paper tape. Requirements imposed on a tape transport mechanism employed in an AMA recorder include the necessity for an unusually high degree of accuracy in tape control under continuously repetitive START-STOP conditions. Additionally, exceptionally low maintenance costs and long life are highly desirable. Tape transports known heretofore are generally unduly complex and typically include conventional tape drive and braking means that are unsuited to the conditions indicated.

Accordingly, an object of the invention is to simplify tape transport mechanisms.

Another object is to enhance the reliability of tape transport mechanisms.

A further object is to render tape transport tape arresting mechanisms more wear resistant.

An additional object is to increase the accuracy of tape transport mechanisms under repetitive START-STOP conditions.

These and other objects are achieved in accordance with the principles of the invention by a tape transport mechanism that employs a multipole, slow speed motor which avoids the disadvantages inherent in a driving arrangement employing pulleys, belts or gear reduction combinations. Additionally, long life of the tape transport mechanism is assured despite the requirements for continuously repetitive START-STOP operation. The well defined and reproducible START-STOP characteristics of a tape drive mechanism in accordance with the invention provide extremely accurate control over tape motion during starting and stopping.

More specifically, a tape transport mechanism in accordance with the invention utilizes electric circuit means to reverse the direction of rotation of the tape drive motor in combination with a unique dual purpose direction sensing switch that responds instantaneously to a change in motor direction to disconnect the motor from its power source and to stop by mechanical means any further rotation of the tape drive motor. Stopping the drive motor, and hence the tape, rapidly and in a well defined and reproducible manner ensures the confinement of tape movement to small and repeatable limits.

In one embodiment of the invention the direction sensing switch takes the form of a pivotally mounted cam that is held in contact directly with the motor shaft as the shaft rotates in the normal or forward direction. As a result of the combination of the cam contour and the eccentric pivotal mounting means, the slightest reversal in the direction of rotation of the motor shaft is translated into a significant rotational movement of the cam. The cam movement described operates a set of contacts, disconnecting the tape drive motor from its power supply. The contact force between the cam and the motor shaft increases abruptly as the cam continues to pivot, thereby stopping the motion of the motor shaft after a very limited arc of reverse rotation. The jamming action of the cam dissipates the rotational energy of the driving motor which in turn prevents the excessive reverse motion of the tape that would occur if the motor were allowed to coast to a position of rest.

Accordingly, one feature of the invention pertains to a dual purpose tape transport tape arresting mechanism that operates to disconnect the tape drive motor from its power supply and at substantially the same time operates to stop the tape drive motor mechanically.

Another feature relates to a combination electrical-mechanical means for stopping the tape drive motor of a tape recorder involving electrical means for reversing the direction of the motor and mechanical means instantaneously responsive to the reversal in direction of rotation of the motor for operating a switch to open the power supply path to the motor and for arresting motor shaft movement.

A further feature of the invention involves the employment of a dual purpose eccentrically mounted cam in a motor stopping system, the cam being pivotally mounted and instantaneously responsive to a reversal in the direction of the motor for opening the power supply path to the motor and for simultaneously jamming against the shaft in a modified braking action.

These and additional objects and features will be fully apprehended from the following detailed description of an illustrative embodiment of the invention and from the appended drawing, in which.

Figure 1:
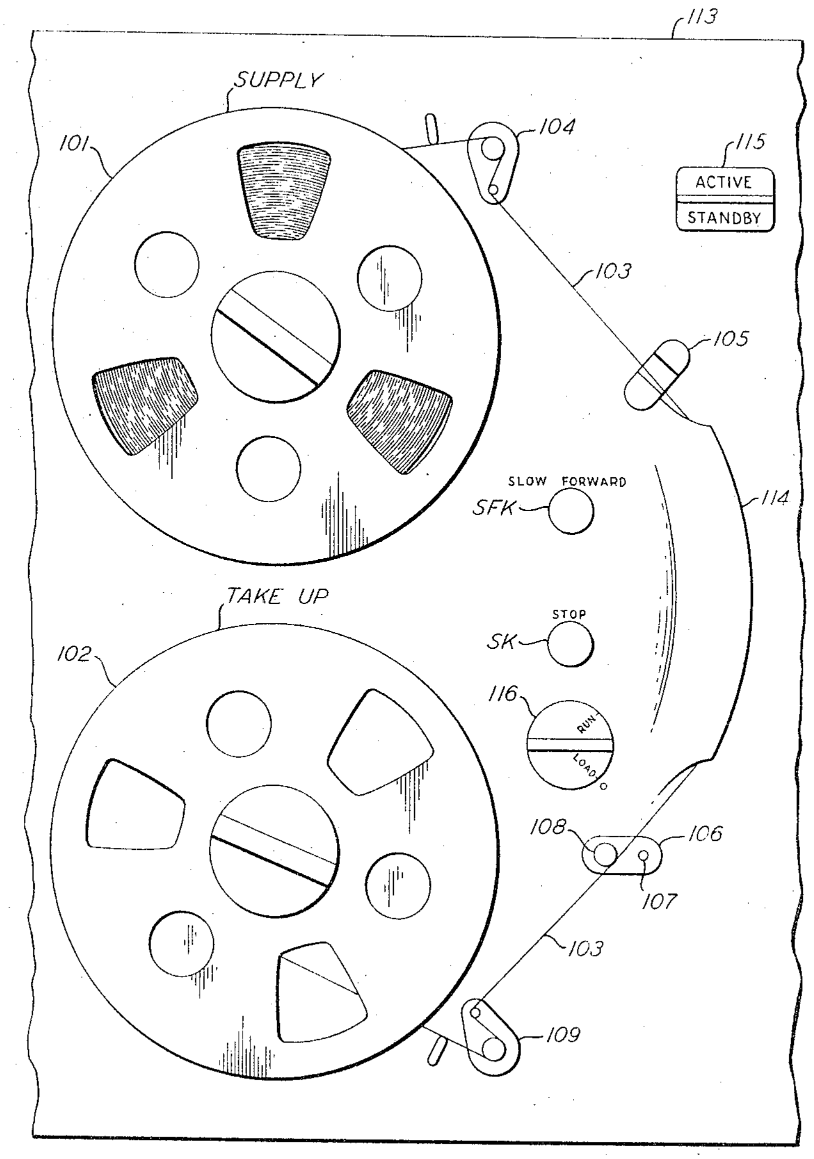
FIG. 1 is an outside front view of a tape recorder employing a tape transport in accordance with the invention.

FIG. 1 shows one illustrative physical arrangement of the magnetic tape and the primary recording machine control elements that may be employed with a tape transport mechanism in accordance with applicants' invention. As in conventional recorders, magnetic tape 103 is stored on supply reel 101. The tape is then fed through a supply tension arm mechanism 104 through an end-of-tape sensing device 105, past the write and read heads (not shown) under a protective lip 114 of front panel 113, thence past the tape drive mechanism 106 which includes pinch roller 108 and capstan 107, through take-up tension arm mechanism 109 and thence to take-up reel 102.

Figure 2:
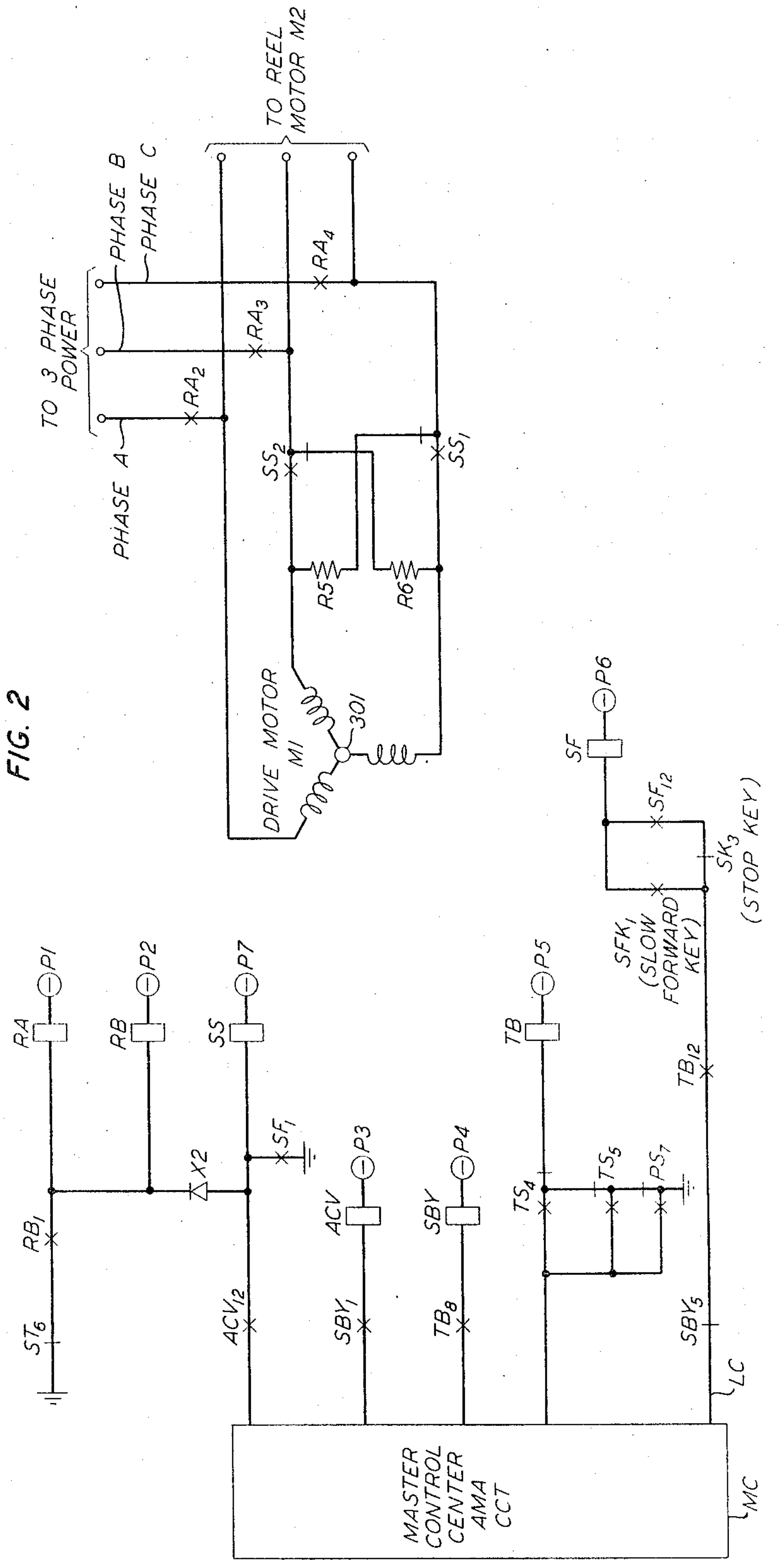
FIG. 2 is a schematic circuit diagram of a part of the control circuitry employed in combination with a tape transport mechanism in accordance with the invention.

During the recording process, tape 103 is pulled from supply reel 101 and rewound on take-up reel 102 through the driving action of motor M1 (FIG. 2) which turns capstan 107. Capstan 107 is merely an extension of shaft 301 of drive motor M1 (FIG. 2). Tape 103 is forced into driving contact with rotating capstan 107 by pinch roller 108. A second motor M2 (FIG. 2) controls the speed of rotation of take-up reel 102. Nonlocking pushbuttons SFK, for SLOW-FORWARD speed, FFK for FAST-FORWARD speed, and SK, the STOP button, are provided on the front panel shown in FIG. 1 to enable manual operation of the tape transport (as contrasted with an automatic type of operation that is typically controlled from the master control center of the AMA system of an electronic central office (ECO)).

An illuminated, two-section bezel 115 on front panel 113 indicates the status of the transport, i.e., whether ACTIVE or STAND-BY, when the machine is under the control of the associated ECO circuits. Illumination is automatically removed during local control operation.

Another control on front panel 113 is a two-position knob 116 designated LOAD and RUN, which is mechanically coupled to pinch roller 108. Knob 116 normally rests in the RUN position corresponding to the position of pinch roller 108 against tape drive capstan 107 with tape 103 pinched therebetween. Knob 116 is turned to LOAD for tape threading when reels are changed.

A part of the tape transport control circuitry is shown schematically in FIG. 2. Motors and motor control relays constitute the major portion of the electrical components employed.

The functions of the circuit shown in FIG. 2 will best be understood from a step-by-step analysis of the sequence of operations involved in bringing the mechanism from a STOP to a START condition and then back to STOP. It is assumed that tape 103 has been positioned properly as described above in the discussion of FIG. 1 and that supply reel 101 has been turned counterclockwise and take-up reel 102 has been turned clockwise to achieve proper tape tension. Tape tension rotates tension arm mechanisms 104 and 109 away from their NO-TAPE positions, thereby removing force from switch plungers (not shown) which are adjacent to tension arm mechanisms 104 and 109. This action restores transfer contacts $TS_4$ and $TS_5$ to the nonoperated condition, which is the condition illustrated in FIG. 2.

With pinch roller control knob 116 turned to the RUN position, switch $PS_7$ associated therewith, operates as shown and pinch roller 108 is brought mechanically into contact with tape 103 against capstan 107. With conditions as described, an operating path for relay TB is completed from ground over normally closed contacts $PS_7$, $TS_5$ and $TS_4$, through relay windings TB and thence to power supply P5. Relay TB operated closes contacts $TB_{12}$ and $TB_8$, the latter contact completing an operating path for relay SBY for remote operation as soon as ground is applied by master control center MC. Current for the operation of relay SBY is from power supply P4.

As soon as ground has been applied to local control lead LC from master control center MC, a momentary operation of SLOW-FORWARD pushbutton SKF operates make contact $SKF_1$, thereby completing an operating path for relay SF. Power for the operation of relay SF is furnished by power supply P6. Relay SF, when operated, locks up over a path extending from power source P6, the windings of relay SF, make contact $SF_{12}$, break contact $SK_3$ of STOP button SK, make contact $TB_{12}$, break contact $SBY_5$, and thence to ground by way of master control center MC.

Relay SF operated operates relay SS over a path which may be traced from power supply P7, through the windings of relay SS, over make contact $SF_1$ and thence to ground. Relay RA is operated over a path which extends from power supply P1, the windings of relay RA, diode X2, make contact $SF_1$ and thence to ground. Relay RB operates over the obvious path which includes diode X2 and make contact $SF_1$. Relay SS operated connects the SLOW-FORWARD winding of motor M1 by way of transfer contacts $SS_1$ and $SS_2$ to the three-phase power circuit in the proper phase relationship for normal (forward) rotation of the armature.

Motor M1 is an induction motor with two separate three-phase windings, a 24 pole and a 4 pole (not shown), for moving magnetic tape 103 at the SLOW-FORWARD (recording) and FAST-FORWARD speeds, respectively. The 24 pole winding is designed to produce a near-synchronous speed on the order of 285 r.p.m. for example, while the 4 pole winding rotates the armature at approximately 1625 r.p.m. These armature speeds are employed so that a directly coupled capstan may be employed, thereby eliminating any need for belts, pulleys or gears. As indicated above, capstan 107 is merely an extension of motor armature shaft 301. As a result of its operation from three-phase A.C. power, drive motor M1 may readily be designed with the proper speed-torque characteristics required for fast starting.

The operation of relay RA supplies three-phase power by way of make contacts $RA_2$, $RA_3$ and $RA_4$ to drive motor M1 and take-up reel motor M2. Motor M2, a conventional three-phase torque motor, may be directly coupled to take-up reel 102 to provide the necessary torque for tape tension and tape-wind during operation. In the quiescent state tape tension is maintained by constantly engaged friction brakes (not shown) on both the supply and take-up reel turntables.

With the operation of motors M1 and M2, tape 103 starts to move and reaches its nominal recording speed, which may be on the order of 5 inches per second, for example, in approximately 100 milliseconds.

The operation of relay RB provides a parallel operating path for relays RA and RB by way of make contact $RB_1$ and closed break contacts $ST_6$. The operation of contacts $ST_6$, the contacts of a direction sensing switch, is described in detail below as a part of the discussion of FIG. 3A.

Tape 103 continues to be driven until relay SF is released. The release of relay SF is normally accomplished by depressing STOP pushbutton SK momentarily, thereby opening break contacts $SK_3$. The holding path for relay SF is opened and, accordingly, relay SF releases. Relay SF released releases relay SS by opening make contact $SF_1$. Relay SS released transposes the connections between the phase B and phase C power leads and the SLOW-FORWARD winding of motor M1. The phase relationship in the winding of motor M1 is now such that its normal rotation is in the reverse direction. Consequently, the armature decelerates rapidly and in a relatively brief period, which may be on the order of 50 milliseconds for example, the armature stops. Power is still applied, however, and accordingly the armature of motor M1 starts rotating in the reverse direction. It is at this point that a direction sensing switch embodying certain features of the invention comes into play. The operation of the direction sensing switch is best described with reference to the sketches shown in FIGS. 3A and 3B.

Figure 3B:
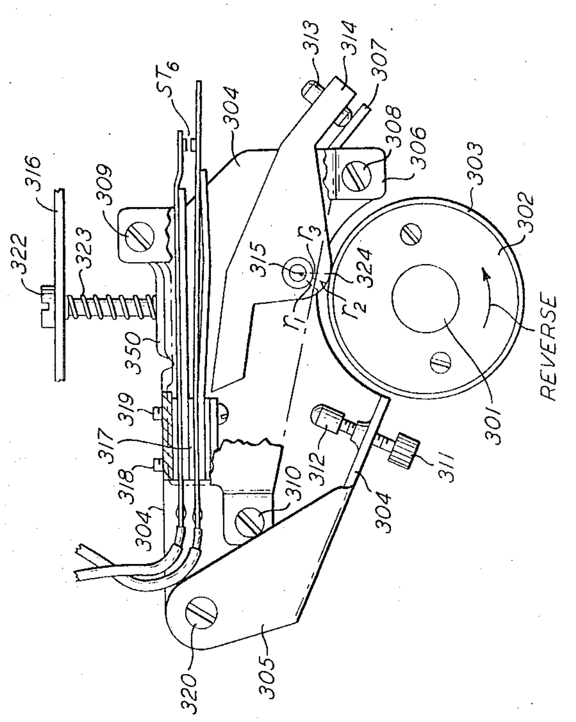
FIG. 3B is a sketch of the switch shown in FIG. 3A in the operated position.
Figure 3A:
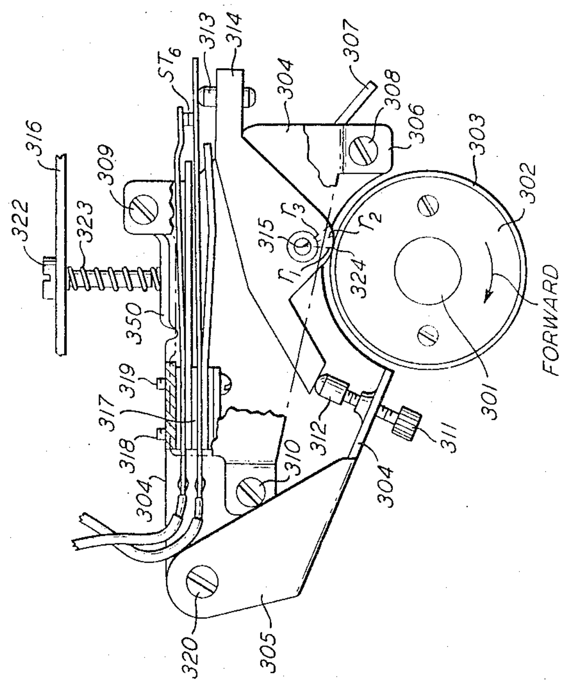
FIG. 3A is a sketch of a tape transport direction sensing switch, in accordance with the invention, shown in the unoperated condition.

In FIG. 3A, an embodiment of a direction sensing switch in accordance with the invention includes a back supporting plate member 304 secured pivotally to a boss on the motor housing (not shown) by pin 320 which extends through an integral tab 305 and a front cover plate 306 secured to back supporting plate 304 by fasteners 308, 309 and 310. Front cover plate 306 and back supporting plate 304 are suitably formed and fastened as described to provide a channel therebetween to accommodate a cam follower member 314. A part of front cover plate 306 is broken away in order to show fully cam follower 314 which is mounted for pivotal movement on needle bearings (not shown) around axis 315. Hub 302 is rigidly mounted on armature shaft 301 of motor M1. Hub 302 has a removable flange which holds an annular ring 303 of suitable cork-like material having a relatively high coefficient of friction and some degree of resiliency. The annular ring of friction material 303 is in actual contact with cam follower 314 at contact point 324, cushioning the contact force and providing a slight frictional drag.

The force between cam follower 314 and hub 302 is adjusted by spring 323 bearing against an upper horizontal tab 350 of plate 304 which plate as described above pivots on pin 320. Spring 323 is positioned by a suitable fastener 322 which also acts as a stop for the upper movement of tab 350. Fastener 322 is in turn anchored to a part of the switch housing 316. Housing 316 is rigidly attached to the frame (not shown) of motor M1. The frictional force between cam follower 314 and ring 303 which occurs as shaft 301 rotates in the clockwise or forward direction is just sufficient to maintain button 313, which is affixed to the end of cam follower 314, in contact with the lower spring member of switch $ST_6$, thereby maintaining switch $ST_6$ in the closed position. The opposite end of cam follower 314 rests on stop member 312 which is affixed to stud 311. Stop member 312 is adjustable to control the deflection of the contact springs of switch $ST_6$. With cam follower 314 positioned as shown in FIG. 3A and motor M1 rotating in the forward direction as described, contact point 324 remains fixed at a distance $r_1$ from pivot axis 315 of cam follower 314.

When motor M1 reverses as described above, armature shaft 301 decelerates, passes through a no-rotation or stop position and then rotates in the reverse direction, as shown in FIG. 3B. In accordance with the invention, cam follower 314 is so positioned and so contoured that a very slight arc of reverse rotation of shaft 301, on the order of 4 degrees for example, is sufficient to rotate cam follower 314 clockwise as shown, causing contacts $ST_6$ to open. During the pivotal movement of cam follower 314, which takes place in response to a reversal in the direction of shaft 301, contact point 324 is shifted on the outer camming surface so that the distance from contact point 324 to axis 315 changes from $r_1$ to a greater distance $r_2$ and finally to a still greater distance $r_3$. The effect of this increase in distance between axis 315 of cam follower 314 and contact point 324 is to increase the contact force between cam follower 314 and hub 302 so that shaft 301 is rapidly brought to a dead stop by a jamming type of braking action after only a relatively few degrees of reverse rotation. As indicated above, tension in spring 323 eliminates initial slippage between cam follower 314 and hub 302.

When the stopping action described occurs, switch support plate 304 pivots on pin 320 and spring 323 is compressed until the end of fastener 322 comes in contact with flange 350 of supporting plate 304. Any further pivotal movement of cam follower 314 causes an increase in the jamming force between the surface of cam follower 314 and friction ring 303 of hub 302. In summary, after approximately 4 degrees of reverse shaft rotation, pivotal motion of plate 304 stops, and contacts $ST_6$ open. Further reverse rotation causes cam follower 314 and hub 302 to jam, stopping motor rotation.

With the opening of contacts $ST_6$ (FIG. 2), the operating path for both relays RA and RB is open and these relays are released. Opening of make contacts $RA_2$, $RA_3$ and $RA_4$ removes three-phase A.C. power from motors M1 and M2. Motor M1 rotating at a low angular velocity in the reverse direction, is stopped rapidly by the braking action of the direction sensing switch as described above. Energy thereby stored in the compliant material of ring 303 causes shaft 301 of motor M1 to turn a small amount in the forward direction and switch $ST_6$ returns to its unactuated position. Motor M2, in an essentially stalled condition at this point, stops as soon as relay RA releases and A.C. power is removed.

The motion of tape 103 follows the rotational changes of capstan 107 (integral with shaft 301). The small amount of reverse tape motion (which may typically be less than 0.050 inch, for example), is compensated for by the nearly equal forward motion at the end of the STOP sequence.

The description above relates only to the action that occurs when the machine is operated in the SLOW-FORWARD condition. If the machine is placed in the FAST-FORWARD condition by depressing pushbutton FFK (FIG. 1) and then stopped through the operation of pushbutton SK (FIG. 1), the action of the arresting mechanism is identical to that already described. For FAST-FORWARD operation additional circuitry and control relays are employed. Such additional circuitry and relays are not shown in FIG. 2, however, inasmuch as the principles employed are adequately illustrated by the SLOW-FORWARD control circuitry shown.

It is to be understood that the embodiment described herein is merely illustrative of the principles of the invention. A wide variety of arrangements and modifications may be devised by persons skilled in the art without departing from the spirit and scope of the invention.

What is claimed is:

1. Apparatus for stopping an electric motor having a shaft and a power source comprising, in combination,
   a motor stop control device,
   circuit means responsive to the operation of said device for shifting the direction of rotation of said motor from a forward direction to a reverse direction,
   switch means for opening said circuit means thereby to disconnect said motor from said source, and
   dual function cam follower means uniformly responsive to a relatively small fraction of a revolution of said shaft in said reverse direction (a) for operating said switch means and (b) for abruptly bearing against said shaft with progressively increasing force until said shaft is brought to rest.

2. Apparatus in accordance with claim 1 including automatically operative means for rotating said shaft back in said forward direction after said shaft has been brought to rest in order to compensate substantially for said small fraction of a revolution of said shaft in said reverse direction.

3. Apparatus in accordance with claim 2 wherein said rotating means comprises a ring of resilient mechanical-energy-storing material on said shaft in contact with said cam follower means.

4. In a tape recorder including a recording tape,
   motor means having a tape driving shaft and a power source,
   apparatus for abruptly stopping said motor thereby to stop movement of said tape comprising, in combination,
   electrical circuit means for reversing the direction of said motor and
   dual purpose mechanical means responsive to a change in the direction of rotation of said shaft for disconnecting said motor means from said power source and for mechanically arresting the movement of said shaft,
   said mechanical means including cam follower means mounted eccentrically for pivotal movement about an axis substantially parallel to the axis of said shaft,
   switch means responsive to said pivotal movement for disconnecting said motor from said source,
   spring means for maintaining a point of contact between said cam follower and said shaft, the distance between said axis of said cam follower and said point of contact remaining substantially constant during said rotation of said shaft in a forward direction,
   said cam follower means including means responsive to a reversal in the direction of rotation of said shaft from said forward direction to a reverse direction for pivoting about said axis of said last named means abruptly increasing said distance between said last named axis and said point of contact, the pressure between said shaft and said cam follower means at said point of contact increasing abruptly to bring said shaft to a rest position.

5. Apparatus in accordance with claim 4 including automatically operative means for rotating said shaft back in said forward direction after said shaft has been brought to said rest position in order to compensate substantially for the rotation of said shaft in said reverse direction.

6. Apparatus in accordance with claim 5 wherein said rotating means comprises a ring of resilient mechanical-energy-storing material on said shaft in contact with said cam follower means.

References Cited by the Examiner

UNITED STATES PATENTS

| | | | |
|---|---|---|---|
| 1,161,932 | 11/1915 | Du Bois | 318—374 |
| 1,802,691 | 4/1931 | Whittingham | 200—61.39 |
| 2,042,915 | 6/1936 | Twist | 200—61.39 |
| 2,155,681 | 4/1939 | Price | 318—273 |
| 2,266,237 | 12/1941 | Newell | 188—82.8 |
| 2,962,237 | 11/1960 | Loewe | 188—82.84 |
| 3,141,626 | 7/1964 | Hoskin | 318—371 |

FOREIGN PATENTS

| | | |
|---|---|---|
| 862,096 | 3/1961 | Great Britain. |

ORIS L. RADER, *Primary Examiner.*

B. DOBECK, *Assistant Examiner.*